United States Patent [19]
Rahman et al.

[11] Patent Number: 5,274,635
[45] Date of Patent: Dec. 28, 1993

[54] METHOD AND APPARATUS FOR ALIGNING A DIGITAL COMMUNICATION DATA STREAM ACROSS A CELL NETWORK

[75] Inventors: Syed A. Rahman, San Jose; James P. O'Hare, Felton, both of Calif.

[73] Assignee: Stratacom, Inc., San Jose, Calif.

[21] Appl. No.: 977,683

[22] Filed: Nov. 18, 1992

[51] Int. Cl.$^5$ ............................................. H04L 12/66
[52] U.S. Cl. ................................... 370/60.1; 370/102
[58] Field of Search ............... 370/60, 60.1, 94.1, 370/94.2, 84, 112, 102, 105.4, 100.1, 105.1, 105.2

[56] References Cited

U.S. PATENT DOCUMENTS

| | | | |
|---|---|---|---|
| 4,594,708 | 6/1986 | Servel et al. | 370/105.4 |
| 5,086,438 | 2/1992 | Sagata et al. | 370/105.4 |
| 5,099,517 | 3/1992 | Gupta et al. | 370/102 |
| 5,111,485 | 5/1992 | Serack | 370/102 |
| 5,157,655 | 10/1992 | Hamlin, Jr. et al. | 370/102 |

*Primary Examiner*—Wellington Chin
*Attorney, Agent, or Firm*—Blakely, Sokoloff, Taylor & Zafman

[57] ABSTRACT

A method and apparatus for aligning a digital communication data stream across a cell network, wherein plurality of timeslot samples are generated by sampling the digital communication data stream transferred over a first circuit-switching communication link. The timeslot samples are assembled into a series of communication cells in a bit or byte skewed arrangement. An align flag in the header of a communication cell indicates that the communication cell contains an aligned timeslot sample.

60 Claims, 10 Drawing Sheets

METHOD AND APPARATUS FOR ALIGNING A DIGITAL COMMUNICATION DATA STREAM ACROSS A CELL NETWORK

FIELD OF THE INVENTION

The present invention pertains to the field of digital communications. More particularly, this invention relates to a method and apparatus for aligning digital communication data streams across a cell network.

BACKGROUND OF THE INVENTION

Packet-switching networks are commonly employed to transfer digital information over long distances. Packet-switching networks are also known as cell networks. A typical packet-switching network enables a variety of communication devices coupled to local communication links to share common carrier communication links. The packet-switching network enables the communication devices to transfer digital information on a demand driven basis. The demand driven sharing of the common carrier communication links reduces the cost of maintaining a long distance communication network.

For example, a packet-switching network can typically enable communication between devices coupled to local T1 communication links. A T1 communication link enables transmission of digital information according to the circuit-switching digital signal level one (DS1) communication protocol. Typically, a source communication controller coupled to the packet-switching network samples a local DS1 data stream, and assembles the local DS1 data stream into one or more communication packet streams. The source communication controller then transmits the communication packets over the packet-switching network.

Usually, a destination communication controller coupled to the packet-switching network receives the communication packets over the packet-switching network. The destination communication controller then disassembles the packets. The destination communication controller reconstructs the original local DS1 data stream or the channels of the original local DS1 data stream.

The throughput of a packet-switching network can be maximized if the error retry overhead of the network is minimized. A communication packet may occasionally be lost during transmission over the packet-switching network. Nevertheless, the reliability of modern packet-switching networks and common carrier facilities usually can hold such losses to an acceptable level.

However, circuit-switching communication formats that require bit alignment or byte alignment within a data stream are particularly vulnerable to the loss of a communication packet during transmission over the packet-switching network.

For example, DS0-A timeslots in a DS1 frame on a T1 communication link have a stuff bit, 6 data bits and a control bit. The control bit qualifies the data bits as either user data or control information. The source communication controller samples DS0-A timeslots, and assemble the DS0-A samples into a series of communication packets. The source communication controller can typically discard the stuff bit of each DS0-A sample in order to maximize bandwidth utilization of the packet-switching network if the line coding technique for the packet-switching network does not require a stuff bit to meet ones density requirements.

However, the discarding of the stuff bit can result in a bit skewed arrangement of DS0-A samples within the communication packets. As a consequence, the destination communication controller cannot properly reconstruct the original DS0-A data stream if a communication packet is lost during transmission over the packet-switching network.

For another example, N×DS0 timeslots in a DS1 frame require that a particular sequence of DS0 timeslots be reconstructed by the destination controller. Moreover, DS0 timeslots supporting a 56 kbps data rate have 7 data bits and a stuff bit. The source communication controller can typically discard the stuff bit of each DS0 timeslot sample in order to maximize bandwidth utilization of the packet-switching network if the line coding technique for the packet-switching network does not require a stuff bit. However, the discarding of the stuff bit can result in a byte skewed arrangement of DS0 timeslot samples within the communication packets. If a communication packet is lost during transmission over the packet-switching network, the destination communication controller cannot reconstruct the proper sequence of DS0 timeslots. As a consequence, the destination communication controller cannot properly reconstruct the original N×DS0 data stream. A similar problem arises when transferring an N×64 kbps data stream in communication packets containing stuff bits for meeting a ones density requirement of the cell network.

One possible method for aligning the digital data stream across the packet-switching network requires transmission of sync packets over the packet-switching network. The sync packets signal the destination communication controller to align the reconstructed data stream. However, the sync packets must be periodically transmitted to ensure proper alignment. Unfortunately, the periodic transmission of the sync packets can reduce the throughput of the packet-switching network by absorbing available bandwidth. Moreover, the sync packets are also susceptible to transmission errors and losses over the packet-switching network.

SUMMARY AND OBJECTS OF THE INVENTION

One object of the present invention is to align digital communication data streams across a cell network.

Another object of the present invention is to align a DS1 data stream transferred across a cell network.

Another object of the present invention is to align a DS1 data stream comprising DS0-A timeslots transferred across a cell network, wherein the DS0-A timeslot samples are assembled in a bit skewed arrangement within the communication cells.

Another object of the present invention is to align a DS1 data stream comprising N×DS0 timeslots transferred across a cell network, wherein the N×DS0 timeslot samples are assembled in a byte skewed arrangement within the communication cells.

A further object of the present invention is to align a DS1 data stream transferred across a cell network, while minimally impacting the bandwidth utilization of the cell network.

These and other objects of the invention are provided by a method and apparatus for aligning a digital communication data stream across a cell network. A plurality of timeslot samples are generated by sampling the digital communication data stream transferred over a circuit-switching communication link.

The timeslot samples are assembled into a series of communication cells. The timeslot samples are assembled such that residual bits from a previous timeslot sample are merged with a current timeslot sample, and excess bits become the residual bits. An align flag in the header of a communication cell is set if the communication cell contains an aligned timeslot sample in the first payload entry. A DS0-A timeslot sample is aligned if the control bit is aligned in the first payload entry. An N×DS0 timeslot sample is aligned if the first DS0 timeslot sample is aligned in the first payload entry.

The communication cells are transferred over a cell network according to a packet-switching communication protocol. The communication cells are received over the cell network, and disassembled at the destination of the communication cells. If the align flag is not set in the header of the communication cell, the timeslot samples are used to reconstruct the digital communication data stream. If the align flag is set in the header of the communication cell, the residual bits from previous timeslot samples are discarded before reconstructing the digital communication data stream.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
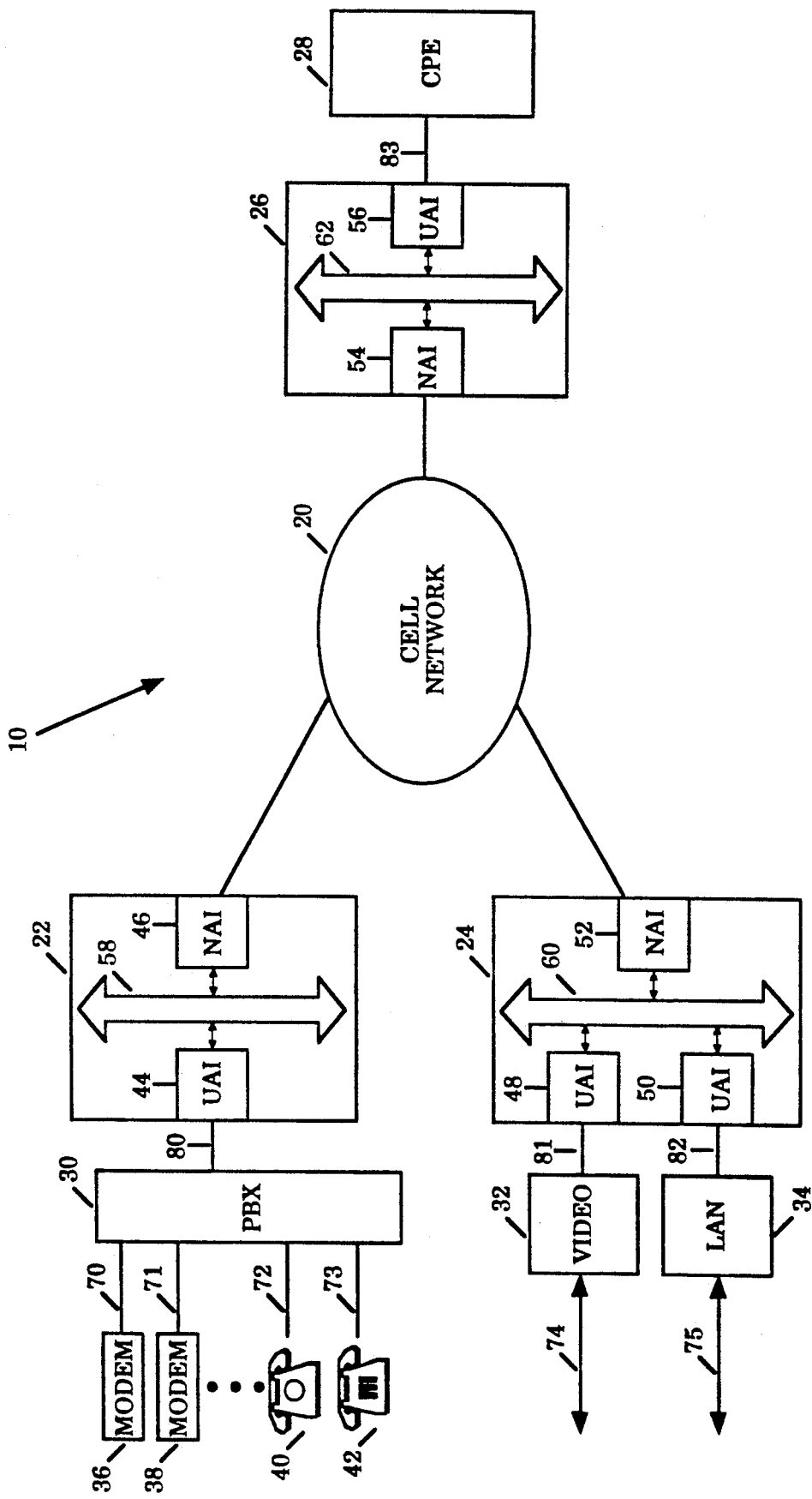
FIG. 1 illustrates a digital communication network comprising a set of integrated cell exchange units and a cell network.

FIG. 1 illustrates one digital communication network 10. The digital communication network 10 comprises a set of integrated cell exchange units 22, 24, and 26, and a cell network 20. The digital communication network 10 enables long distance communication among a wide variety of customer premises equipment.

The integrated cell exchange units 22-26 and the cell network 20 enables digital communication among a private branch exchange (PBX) 30, a video communication controller 32, a local area network (LAN) controller 34, and a set of customer premises equipment (CPE) 28.

The cell network 20 is comprised of a set of high speed digital communications links. The integrated cell exchange units 22-26 transfer digital information over the cell network 20 according to a packet-switching communication protocol.

For one embodiment, the cell network 20 is comprised of a set of T1 communication links. The T1 communication links enable transfer of digital information according to the digital signal level one (DS1) communication protocol. The integrated cell exchange units 22-26 transfer digital information over the cell network 20 according to a packet-switching communication protocol. The integrated cell exchange units 22-26 overlay the packet-switching protocol onto the DS1 communication facilities of the cell network 20.

The PBX 30 enables communication between the integrated cell exchange unit 22 and a set of low speed communication devices, including a set of modems 36 and 38, and a set of telephones 40 and 42. The modems 36 and 38 and the telephones 40 and 42 communicate over a set of low speed communication links 70-73. The PBX 30 communicates with the integrated cell exchange unit 22 over a communication link 80.

The video communication controller 32 enables communication between the integrated cell exchange unit 24 and a video communication channel 74. The video communication controller 32 communicates with the integrated cell exchange unit 24 over a communication link 81.

A local area network (LAN) controller 34 enables communication between the integrated cell exchange unit 24 and a LAN communication link 75. The LAN controller 34 communicates with the integrated cell exchange unit 24 over a communication link 82.

The CPE 28 is coupled to communicate with the integrated cell exchange unit 26 over a communication link 83. The CPE 28 represents PBX equipment, channel bank equipment, video communication equipment, LAN controllers, as well as a wide variety of other digital communication equipment.

Each of the integrated cell exchange units 22-26 is comprised of one or more user access interfaces (UAI), and one or more network access interfaces (NAI). A UAI enables communication between an integrated cell exchange unit and a variety of customer premises equipment, including PBXs, channel banks, video controllers, and LAN controllers. An NAI enables communication over the cell network 20. A cell bus enables communication between a UAI and an NAI within an integrated cell exchange unit.

The integrated cell exchange unit 22 has a UAI 44 and an NAI 46. The UAI 44 enables communication with the PBX 30 over the communication link 80 according to a circuit-switching communication protocol. The NAI 46 enables communication over the cell network 20 according to a packet-switching communication protocol. The UAI 44 and the NAI 46 exchange communication cells over a cell bus 58.

The integrated cell exchange unit 24 has a UAI 48 that enables communication with the video controller 32 over the communication link 81 according to a circuit-switching communication protocol, and a UAI 50 that enables communication with the LAN controller 34 over the communication link 82 according to a circuit-switching communication protocol. The integrated cell exchange unit 24 also has an NAI 52 that enables communication over the cell network 20 according to the packet-switching communication protocol. The UAI 48, the UAI 50, and the NAI 52 exchange communication cells over a cell bus 60.

The integrated cell exchange unit 26 has a UAI 56 that enables communication with the CPE 28 over the communication link 83 according to a circuit-switching communication protocol, and an NAI 54 that enables communication over the cell network 20 according to the packet-switching communication protocol. The UAI 56 and the NAI 54 exchange communication cells over a cell bus 62.

The integrated cell exchange units 22-26 enable demand driven virtual communication links over the cell network 20 according to the communication activities of the customer premises equipment.

For example, the integrated cell exchange units 22 and 26 create demand driven virtual communication links between devices coupled to the PBX 30 and the CPE 28. To create a virtual communication link from the modem 36 to the CPE 28, the UAI 44 receives digital data from the PBX 30 according to the circuit-switching communication protocol on the communication link 80. The circuit-switching communication protocol on the communication link 80 contains data channels for the devices coupled to the PBX 30, including the modem 36.

The UAI 44 assembles the digital data corresponding to the modem 36 into one or more outbound communication cells targeted for the CPE 28. The UAI 44 assembles the digital data received from the PBX 30 into outbound communication cells according to the packet-switching communication protocol of the cell network 20. The UAI 44 assembles the digital data into outbound communication cells such that a given outbound communication cell carries the digital data from only one device coupled to the PBX 30.

The UAI 44 transfers the outbound communication cells to the NAI 46 over the cell bus 58. The NAI 46 receives the outbound communication cells over the cell bus 58 and transfers the outbound communication cells over the cell network 20.

The NAI 54 receives the communication cells targeted for the CPE 28 over the cell network 20 as inbound communication cells. The NAI 54 transfers the inbound communication cells to the UAI 56 over the cell bus 62. The UAI 56 disassembles the inbound communication cells from the packet-switching format of the cell network 20. The UAI 56 then transfers the digital data targeted for the CPE 28 over the communication link 83 according to a circuit-switching communication protocol.

To create a virtual communication link from the CPE 28 to the modem 36, the UAI 56 receives digital data from the CPE 28 according to the circuit-switching communication protocol on the communication link 83. The UAI 56 assembles the digital data received from the CPE 28 into one or more outbound communication cells targeted for the modem 36 according to the packet-switching communication protocol of the cell network 20.

The UAI 56 transfers the outbound communication cells to the NAI 54 over the cell bus 62. The NAI 54 receives the outbound communication cells over the cell bus 62, and transfers the outbound communication cells over the cell network 20 according to the packet-switching communication protocol.

The NAI 46 receives the communication cells targeted for the modem 36 over the cell network 20 as inbound communication cells. The NAI 46 transfers the inbound communication cells over the cell bus 58. The UAI 44 receives the inbound communication cells over the cell bus 58, and disassembles the inbound communication cells from the packet-switching format of the cell network 20. The UAI 44 then transmits the digital data targeted for the modem 36 to the PBX 30 over the communication link 80 according to the circuit-switching communication protocol.

In a similar manner, the integrated cell exchange units 24 and 26 create virtual communication links between the video communication controller 32 and the CPE 28, and between the LAN controller 34 and the CPE 28. Also, the integrated cell exchange units 22 and 24 create virtual communication links between the video communication controller 32 and the PBX 30, and between the LAN controller 34 and the PBX 30.

For one embodiment, the communication links 80-83 are circuit-switching T1 communication links for transferring digital information according to the DS1 communication protocol. A DS1 frame is comprised of 24 DS0 time slots. Each of the DS0 time slots has a data rate of 64 kbps.

A communication device coupled to the communication links 80-83 may use the DS0 time slots as DS0-A channels for low speed communication. Typically, a DS0-A channel enables data transfer rates of 2.4 kbps, 4.8 kbps, 9.6 kbps, as well as 56 kbps. Alternatively, a communication device coupled to the communication links 80-83 may group the DS0 timeslots as N×DS0 channels for higher speed communication.

For example, the digital data corresponding to the modem 36 occupies a DS0-A channel within a DS1 data stream transferred over the communication link 80. Similarly, the digital data corresponding to the modem 38 occupies a separate DS0-A channel on the communication link 80. The digital data corresponding to the video communication channel 74 occupies an N×DS0 channel within a DS1 data stream on the communication link 81.

Figure 2:
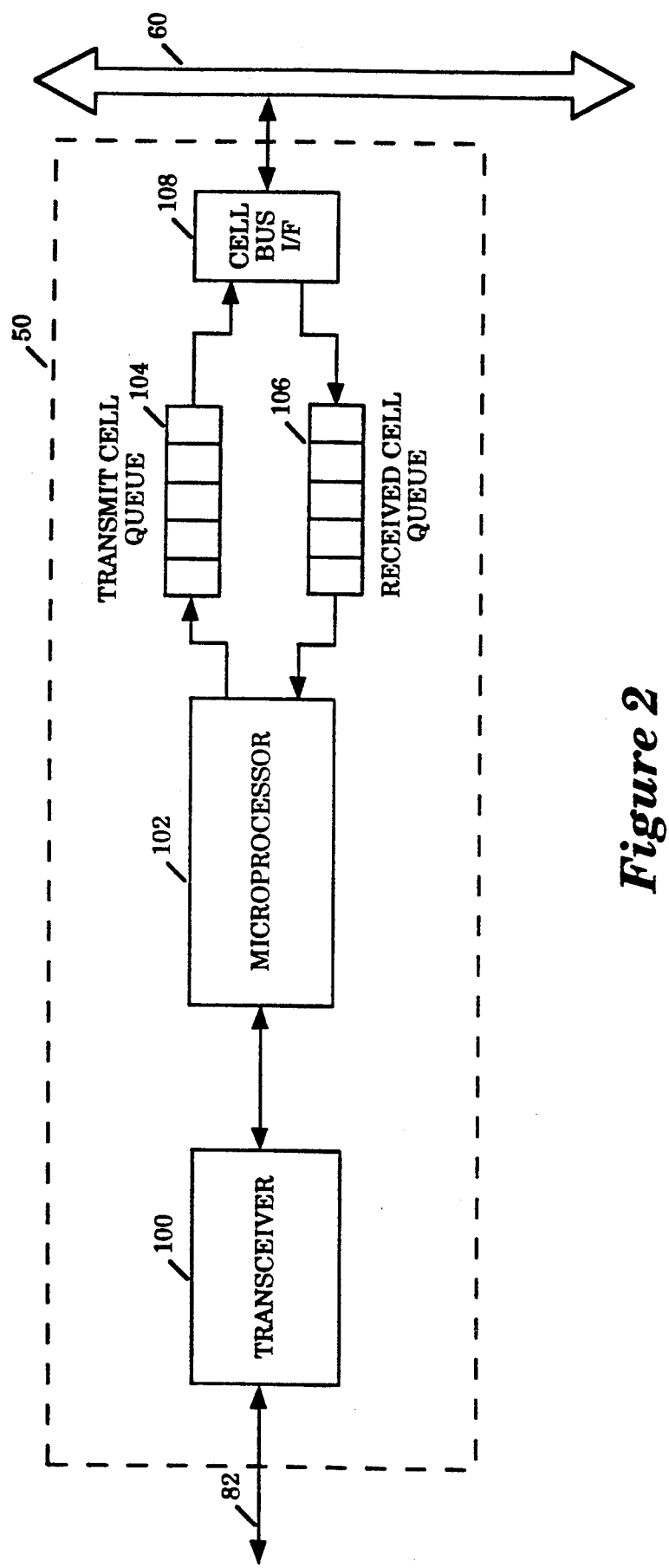
FIG. 2 is a block diagram illustrating a UAI, which comprises a transceiver, a microprocessor, a transmit cell queue, a received cell queue, and a cell bus interface.

FIG. 2 is a block diagram illustrating the UAI 50. The UAI 50 is substantially similar to the UAI 44, the UAI 48, and the UAI 56. The UAI 50 comprises a transceiver 100, a microprocessor 102, a transmit cell queue 104, a received cell queue 106, and a cell bus interface 108.

The transceiver 100 transfers digital data over the communication link 82 according to a circuit-switching communication protocol. The microprocessor 102 assembles the digital data received over the communication link 82 into one or more outbound communication cells according to the packet-switching communication protocol of the cell network 20. The microprocessor 102 transfers the outbound communication cells to the transmit cell queue 104. The cell bus interface 108 accesses the outbound communication cells from the transmit cell queue 104, and transfers the outbound communication cells over the cell bus 60.

The cell bus interface 108 receives inbound communication cells from an NAI over the cell bus 60, and transfers the inbound communication cells into the received cell queue 106. The microprocessor 102 accesses the inbound communication cells from the received cell queue 106. The microprocessor 102 disassembles the inbound communication cells from the packet-switching communication protocol of the cell network 20. The microprocessor 102 transfers the digital data extracted from the inbound communication cells to the transceiver 100. The transceiver 100 transfers the digital data over the communication link 82 according to the circuit-switching communication protocol.

Figure 3:
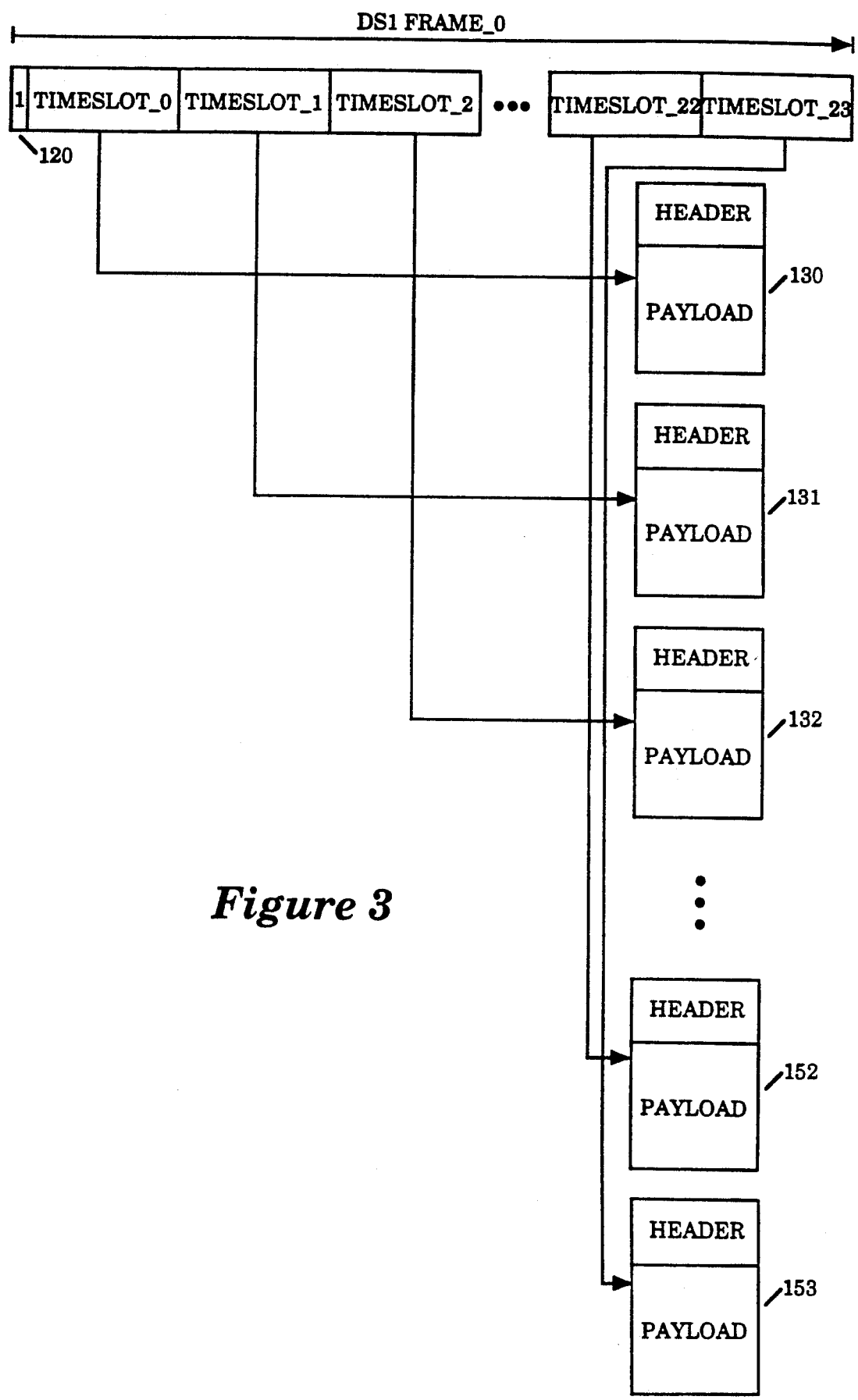
FIG. 3 illustrates a method for assembling digital data received over a circuit-switching communication link into a set of outbound communication cells for transfer over the cell network according to a packet switching communication protocol.

FIG. 3 illustrates a method for assembling digital data received over a circuit-switching communication link into a set of outbound communication cells for transfer over the cell network 20 according to a packet switching communication protocol. For the example shown, the communication link 82 receives a digital data stream according to the DS1 communication protocol, wherein a DS1 frame comprises 24 DS0_A timeslots.

The transceiver 100 receives a serial data stream comprising a series of DS1 frames such as a DS1 FRAME_0. The DS1 FRAME_0 comprises a framing bit 120 and a set of 24 eight bit DS0 timeslots (TIMESLOT_0 through TIMESLOT_23) corresponding to the 24 channels of a DS1 frame.

The microprocessor 102 samples the DS0 timeslots TIMESLOT_0 through TIMESLOT_23 from the transceiver 100, and assembles a set of 24 outbound communication cells 130-153.

The outbound communication cells 130-153 accommodate timeslot samples from the 24 DS0-A channels of a DS1 frame. Each outbound communication cell 130-153 has a header portion and a payload portion. The header portion of each outbound communication cell 130-153 identifies the target for the communication cell, as well as address information and error checking information. The payload portion carries timeslot samples.

The microprocessor 102 assembles the TIMESLOT_0 through TIMESLOT_23 samples into separate outbound communication cells. The microprocessor 102 assembles the DS0 timeslot sample TIMESLOT_0 of the DS1 FRAME_0 into the payload portion of the communication cell 130. Similarly, the microprocessor 102 assembles the DS0 timeslot sample TIMESLOT_1 into the payload portion of the communication cell 131 and the DS0 timeslot sample TIMESLOT_2 into the payload portion of the communication cell 132. Finally, the microprocessor 102 assembles the DS0 timeslot sample TIMESLOT_22 into the payload portion of the communication cell 152 and the DS0 timeslot sample TIMESLOT_23 into the payload portion of the communication cell 153.

The microprocessor 102 assembles the DS0 timeslot samples TIMESLOT_0 through TIMESLOT_23 for a next DS1 frame received from the transceiver 100 into the communication cells 130-153 is a similar manner. When the payload portions of the outbound communication cells 130-153 are full, the microprocessor 102 transfers the outbound communication cells 130-153 to the transmit cell queue 104.

Figure 4:
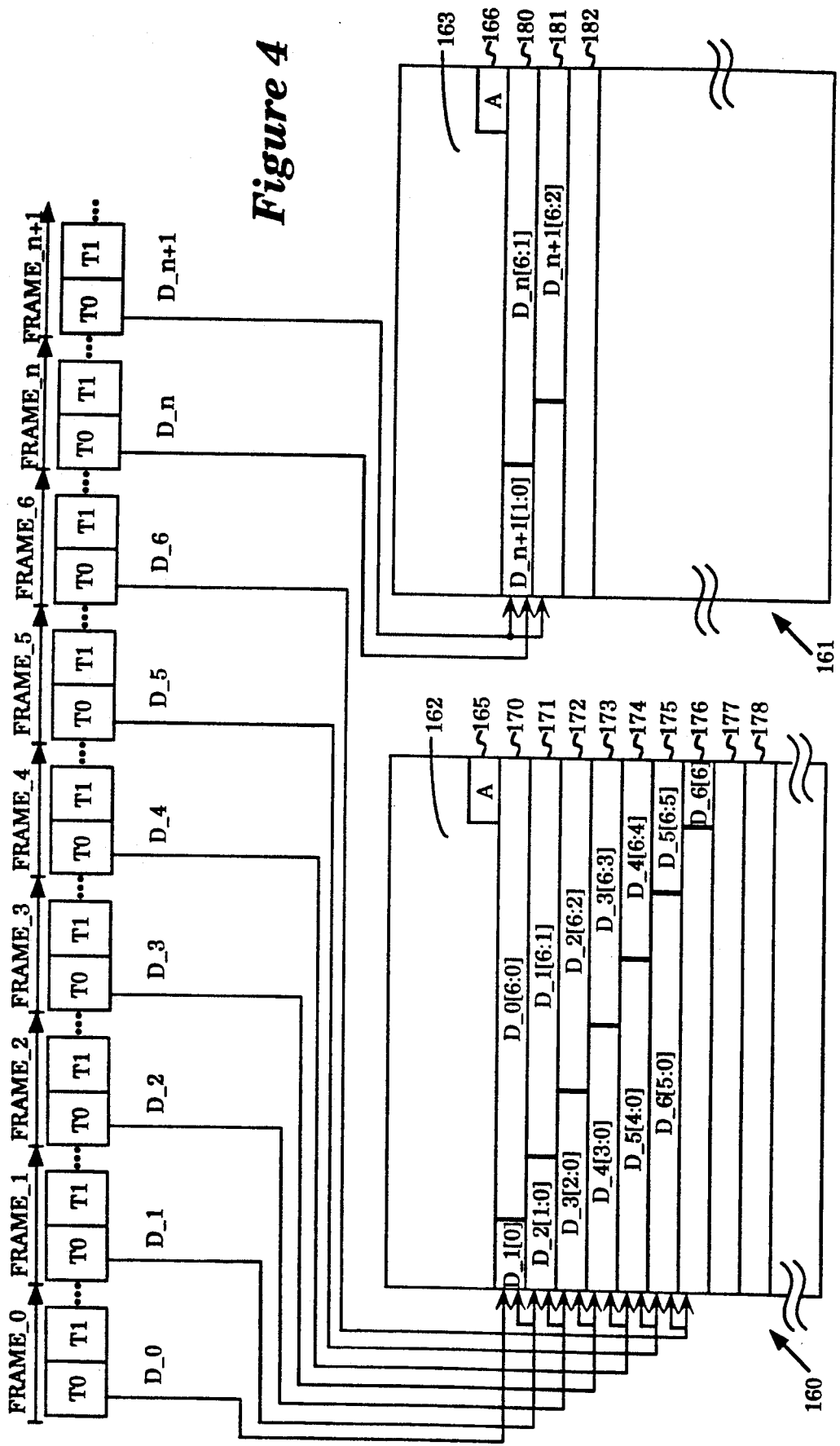
FIG. 4 illustrates a method for assembling a DS1 data stream into outbound communication cells for transfer over the cell network, wherein the DS1 data stream comprises subrate DS0-A timeslots.

FIG. 4 illustrates a method for assembling a DS1 data stream into outbound communication cells for transfer over the cell network 20. For the example shown, the communication link 82 transfers a DS1 data stream comprising 24 DS0-A timeslots. The NAI 52 employs an 8/8 line coding method for transferring data over the network 20 that does not require a stuff bit to meet ones density requirements.

As illustrated, the DS1 data stream comprises a series of DS1 frames (FRAME_0 through FRAME_n+1). Each DS1 frame in the series FRAME_0 through FRAME_n+1 contains 24 DS0 timeslots. $D\_0$ through $D\_{n+1}$ identify the samples of the DS0 time slots corresponding to timeslot 0 (T0) from each DS1 frame in the DS1 data stream FRAME_0 through FRAME_n+1.

Each DS0-A timeslot comprises an S bit, 6 data bits, and a C bit. The S bit is a stuff bit that is normally set to one. The C bit is a control bit. If the C bit is one, the corresponding data bits comprises user data. If the C bit is a zero, the corresponding data bits comprises control information such as an out of sync indicator.

The microprocessor 102 samples the DS1 data stream FRAME_0 through FRAME_n+1 from the transceiver 100. The microprocessor 102 assembles the DS0 timeslot samples $D\_0$ through $D\_{n+1}$ into a pair of outbound communication cells 160-161. The microprocessor 102 discards the S bits of the DS0 timeslot samples $D\_0$ through $D\_{n+1}$ when assembling the communication cells 160-161. The microprocessor 102 transfers bits 0-6 (i.e. the C bit and the data bits) of each of the DS0 timeslot samples $D\_0$ through $D\_{n+1}$ into the outbound communication cells 160-161.

The outbound communication cell 160 has a header portion 162 and a payload portion for carrying the indicated bits of the DS0 timeslot samples $D\_0$ through $D\_{n+1}$. The payload portion of the outbound communication cell 160 comprises a set of payload bytes including payload bytes 170-178. Similarly, the outbound communication cell 161 has a header portion 163 and a payload portion. The payload portion of the outbound communication cell 161 includes payload bytes 180-182 for carrying the indicated bits of the DS0 timeslot samples $D\_0$ through $D\_{n+1}$.

The header portions 162 and 163 identify a target for the corresponding communication cell, as well as address information and error checking information.

The header portions 162 and 163 also contain an align flag (A) indicating whether the first byte of the payload portion of the corresponding outbound communication cell contains a bit-aligned C bit. The align flag 165 indicates whether the payload byte 170 contains a bit-aligned C bit. Similarly, the align flag 166 indicates whether the payload byte 180 contains a bit-aligned C bit.

The microprocessor 102 places bits 0-6 of the DS0 timeslots sample $D\_0$ ($D\_0[6:0]$) into bits 0-6 of the payload byte 170. At this point, no residue bits exist from a last DS0 sample. Moreover, the payload byte 170 is the first byte of the outbound communication cell 160. The microprocessor 102 sets the align flag 165 to indicate that the payload byte 170 contains a bit-aligned C bit.

The microprocessor 102 places bit 0 of the DS0 timeslot sample D_1 (D_1[0]) into bit 7 of the payload byte 170. Bits 1-6 of the DS0 timeslot sample D_1 (D_1[6:1]) are residue bits. The microprocessor 102 merges the residue bits D_1[6:1] with bits 0-1 of the DS0 timeslot sample D_2 (D_2[1:0]). The microprocessor 102 places bits 1-6 of the DS0 timeslot sample D_1 (D_1[6:1]) into bits 0-5 of the payload byte 171, and places bits 0-1 of the DS0 timeslot sample D_2 (D_2[1:0]) into bits 6-7 of the payload byte 171. The excess bits D_2 (D_2[6:2]) become the new residue bits. The microprocessor 102 places the new residue bits D_2[6:2] into bits 0-4 of the payload byte 172.

The microprocessor 102 continues the above described sequence of merging residue bits from the last DS0 sample into the next DS0 sample, and using the excess bits as new residue bits. Accordingly, the microprocessor 102 places bits 0-2 of the DS0 timeslot sample D_3 (D_3[2:0]) into bits 5-7 of the payload byte 172, and places bits 3-6 of the DS0 timeslot sample D_3 (D_3[6:3]) into bits 0-3 of the payload byte 173. The microprocessor 102 places bits 0-3 of the DS0 timeslot sample D_4 (D_4[3:0]) into bits 4-7 of the payload byte 173, and places bits 4-6 of the DS0 timeslot sample D_4 (D_4[6:4]) into bits 0-2 of the payload byte 174. The microprocessor 102 places bits 0-4 of the DS0 timeslot sample D_5 (D_5[4:0]) into bits 3-7 of the payload byte 174, and places bits 5-6 of the DS0 timeslot sample D_5 (D_5[6:5]) into bits 0-1 of the payload byte 175. The microprocessor 102 places bits 0-5 of the DS0 timeslot sample D_6 (D_6[5:0]) into bits 2-7 of the payload byte 175, and places bit 6 of the DS0 timeslot sample D_6 (D_6[6]) into bit 0 of the payload byte 176.

The bit skewed sequence continues into the outbound communication cell 161. The microprocessor 102 places the residue bits from the last DS0 sample (D_n[6:1]) into bits 0-5 of the payload byte 180. The microprocessor 102 does not set the align flag 166 because the payload byte 180 does not contain a bit-aligned C bit.

The microprocessor 102 places bits 0-1 of the DS0 timeslot sample D_n+1 (D_n+1[1:0]) into bits 6-7 of the payload byte 180, and places bits 2-6 of the DS0 timeslot sample D_n+1 (D_n+1[6:2]) into bits 0-4 of the payload byte 181.

Figure 5:
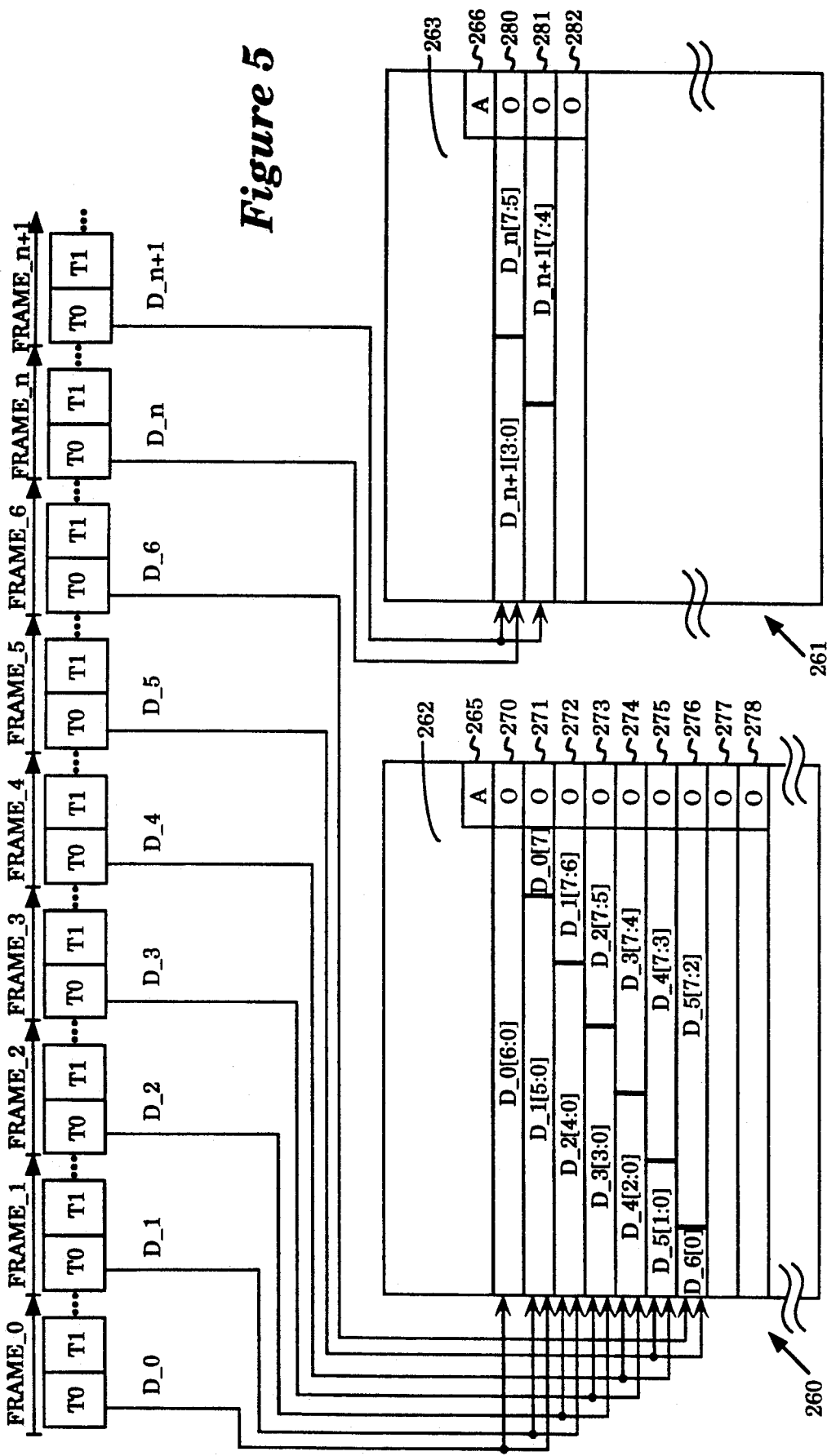
FIG. 5 illustrates a method for assembling a DS1 data stream into outbound communication cells for transfer over the cell network, wherein the DS1 data stream comprises DS0-A timeslots running at 56 kbps.

FIG. 5 illustrates a method for assembling a DS1 data stream into outbound communication cells for transfer over the cell network 20, wherein the DS1 data stream comprises DS0-A timeslots running at 56 kbps. The NAI 52 employs a $\frac{7}{8}$ line coding method for transferring data over the network 20 that requires a stuff bit to meet a ones density requirement for the communication links of the network 20.

As illustrated, the DS1 data stream comprises a series of DS1 frames (FRAME_0 through FRAME_n+1). Each DS1 frame in the series FRAME_0 through FRAME_n+1 contains 24 56 kbps DS0-A timeslots. D_0 through D_n+1 identify the timeslot samples corresponding to 56 kbps DS0-A timeslot 0 (T0) from each DS1 frame in the DS1 data stream FRAME_0 through FRAME_n+1. Each 56 kbps DS0-A timeslot comprises 7 data bits and a C bit.

The microprocessor 102 samples the DS1 data stream FRAME_0 through FRAME_n+1 from the transceiver 100. The microprocessor 102 assembles the DS0-A timeslot samples D_0 through D_n+1 into a pair of outbound communication cells 260-261. The microprocessor 102 transfers the C bit and the data bits of each of the DS0-A timeslot samples D_0 through D_n+1 into the outbound communication cells 260-261. The C bit is bit 0, and the data bits are bits 1-7 of each of the DS0-A timeslot samples D_0 through D_n+1.

The outbound communication cell 260 has a header portion 262 and a payload portion for carrying the indicated bits of the DS0-A timeslot samples D_0 through D_n+1. The payload portion of the outbound communication cell 260 comprises a set of payload bytes including payload bytes 270-278. Similarly, the communication cell 261 has a header portion 263 and a payload portion. The payload portion of the outbound communication cell 261 includes payload bytes 280-282 for carrying the indicated bits of the DS0-A timeslot samples D_0 through D_n+1.

The header portions 262 and 263 identify a target for the corresponding outbound communication cell, as well as address information and error checking information. The header portions 262 and 263 also contain an align flag (A) indicating whether the first byte of the payload portion of the corresponding outbound communication cell contains a bit-aligned C bit. The align flag 265 indicates whether the payload byte 270 contains a bit-aligned C bit. Similarly, the align flag 266 indicates whether the payload byte 280 contains a bit-aligned C bit.

The microprocessor 102 places a stuff bit (O) into bit 0 of all payload bytes of the outbound communication cells 260-261 to meet the ones density requirements of the cell network 20. The microprocessor 102 performs the above described sequence of merging residue bits from the last DS0 sample into the next DS0 sample, and using the excess bits as new residue bits. Accordingly, the microprocessor 102 places bits 0-6 of the DS0-A timeslot sample D_0 (D_0[6:0]) into bits 1-7 of the payload byte 270. The microprocessor 102 sets the align flag 265 to indicate that the payload byte 270 contains a bit-aligned C bit since the payload byte 270 is the first byte of the outbound communication cell 260 and since no residue bits exist from the last DS0 sample.

The microprocessor 102 places bit 7 of the DS0-A timeslot sample D_0 (D_0[7]) into bit 1 of the payload byte 271, and places bits 0-5 of the DS0-A timeslot sample D_1 (D_1[5:0]) into bits 2-7 of the payload byte 271. The microprocessor 102 places bits 6-7 of the DS0-A timeslot sample D_1 (D_1[7:6]) into bits 1-2 of the payload byte 272, and places bits 0-4 of the DS0-A timeslot sample D_2 (D_2[4:0]) into bits 3-7 of the payload byte 272.

The microprocessor 102 places bits 5-7 of the DS0-A timeslot sample D_2 (D_2[7:5]) into bits 1-3 of the payload byte 273, and places bits 0-3 of the DS0-A timeslot sample D_3 (D_3[3:0]) into bits 4-7 of the payload byte 273. The microprocessor 102 places bits 4-7 of the DS0-A timeslot sample D_3 (D_3[7:4]) into bits 1-4 of the payload byte 274, and places bits 0-2 of the DS0-A timeslot sample D_4 (D_4[2:0]) into bits 5-7 of the payload byte 274. The microprocessor 102 places bits 3-7 of the DS0-A timeslot sample D_4 (D_5[7:3]) into bits 1-5 of the payload byte 275, and places bits 0-1 of the DS0-A timeslot sample D_5 (D_5[1:0]) into bits 6-7 of the payload byte 275. The microprocessor 102 places bits 2-7 of the DS0-A timeslot sample D_5 (D_5[7:2]) into bits 1-6 of the payload byte 276, and places bit 0 of the DS0-A timeslot sample D_6 (D_6[0]) into bit 7 of the payload byte 276.

The bit skewed sequence continues into the outbound communication cell 261. The microprocessor 102 places the residue bits from the last DS0-A sample (D_n[7:5]) into bits 1-3 of the payload byte 280. The microprocessor 102 does not set the align flag 266 because the payload byte 280 does not contain a bit-aligned C bit.

The microprocessor 102 places bits 0-3 of the DS0-A timeslot sample D_n+1 (D_n+1[3:0]) into bits 4-7 of the payload byte 280, and places bits 4-7 of the DS0-A timeslot sample D_n+1 (D_n+1[7:4]) into bits 1-5 of the payload byte 281.

Figure 6:
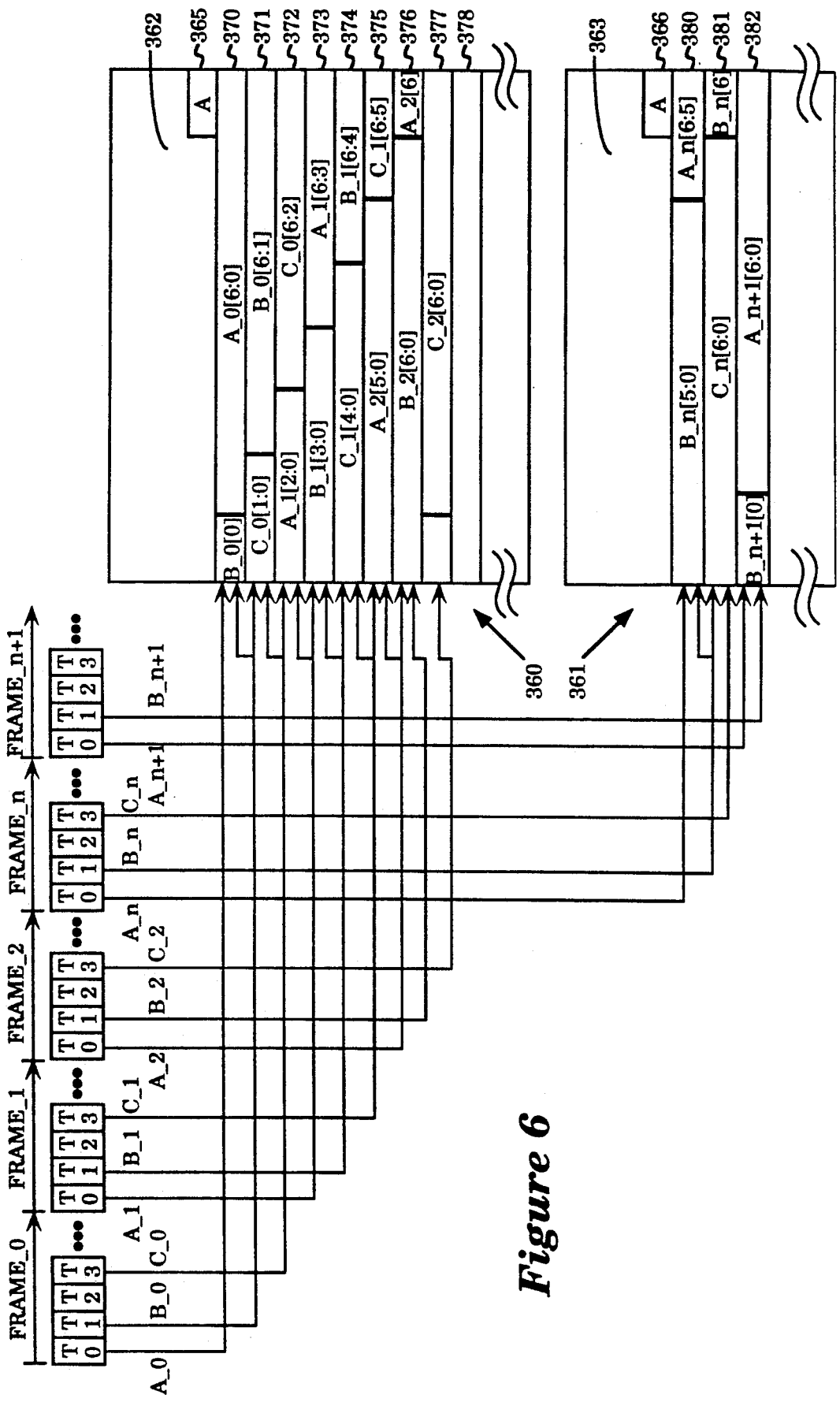
FIG. 6 illustrates a method for assembling a DS1 data stream containing N×DS0 data into outbound communication cells for transfer over the cell network.

FIG. 6 illustrates a method for assembling a DS1 data stream containing N×DS0 data into outbound communication cells for transfer over the cell network 20. For this example, the N×DS0 data comprises 3 N×56 k timeslots. The NAI 52 employs an 8/8 line coding method for transferring data over the network 20 that does not require a stuff bit to meet ones density requirements.

As shown, the DS1 data stream comprises a series of DS1 frames (FRAME_0 through FRAME_n+1). Each DS1 frame in the DS1 data stream FRAME_0 through FRAME_n+1 contains 24 timeslots, wherein 3 timeslots form the 3×56 kbps connection. The N×56 kbps timeslots comprise the timeslots 0, 1, and 3 of each DS1 frame in the DS1 data stream FRAME_0 through FRAME_n+1 for this example.

A_0 through A_n+1 identify the timeslot samples corresponding to the 56 kbps timeslot 0 (T0) from each DS1 frame in the DS1 data stream FRAME_0 through FRAME_n+1. B_0 through B_n+1 identify the timeslot samples corresponding to the 56 kbps timeslot 1 (T1) from each DS1 frame in the DS1 data stream FRAME_0 through FRAME_n+1. C_0 through C_n+1 identify the timeslot samples corresponding to the 56 kbps timeslot 3 (T3) from each DS1 frame in the DS1 data stream FRAME_0 through FRAME_n+1.

Each data byte corresponding to the 56 kbps timeslots T0, T1, and T3 comprises 7 data bits, and an S bit. The S bit is a stuff bit that is normally set to one. The microprocessor 102 samples the DS1 data stream FRAME_0 through FRAME_n+1 from the transceiver 100. The microprocessor 102 assembles the DS0 timeslot samples A_0, B_0, and C_0 through A_n+1, B_n+1, and C_n+1 into a pair of outbound communication cells 360-361.

The microprocessor 102 discards the S bits of the DS0 timeslot samples A_0, B_0, and C_0 through A_n+1, B_n+1, and C_n+1 when assembling the communication cells 360-361. The microprocessor 102 transfers the 7 data bits of each of the DS0 timeslot samples A_0, B_0, and C_0 through A_n+1, B_n+1, and C_n+1 into the outbound communication cells 360-361. For this example, the 7 data bits comprise bits 0-6 of each of the DS0 timeslot samples A_0, B_0, and C_0 through A_n+1, B_n+1, and C_n+1.

The outbound communication cell 360 has a header portion 362 and a payload portion for carrying the indicated bits of the DS0 timeslot samples A_0, B_0, and C_0 through A_n+1, B_n+1, and C_n+1. The payload portion of the outbound communication cell 360 comprises a set of payload bytes including payload bytes 370-378. Similarly, the outbound communication cell 361 has a header portion 363 and a payload portion. The payload portion of the outbound communication cell 361 includes payload bytes 380-382 for carrying the indicated bits of the DS0 timeslot samples A_0, B_0, and C_0 through A_n+1, B_n+1, and C_n+1.

The header portions 362 and 363 identify a target for the corresponding communication cell, as well as address information and error checking information.

The header portions 362 and 363 also contain an align flag (A) indicating whether the first byte of the payload portion of the corresponding outbound communication cell contains an aligned sample corresponding to the first DS0 time slot of the N×DS0 channel. The align flag 365 indicates whether the payload byte 370 contains an aligned sample corresponding to the first DS0 time slot. Similarly, the align flag 366 indicates whether the payload byte 380 contains an aligned sample corresponding to the first DS0 time slot.

The microprocessor 102 performs the above described sequence of merging residue bits from the last DS0 sample into the next DS0 sample, and using the excess bits as new residue bits. Accordingly, the microprocessor 102 places bits 0-6 of the DS0 timeslot sample A_0 (A_0[6:0]) into bits 0-6 of the payload byte 370.

The microprocessor 102 sets the align flag 365 to indicate that the payload byte 370 contains an aligned sample corresponding to the first DS0 time slot. The microprocessor 102 sets the align flag 365 because the DS0 timeslot sample A_0 corresponds to the first DS0 time slot for the N×56 k channel, and because no residue bits exists from the last DS1 frame.

The microprocessor 102 places bit 0 of the DS0 timeslot sample B_0 (B_0[0]) into bit 7 of the payload byte 370, and places bits 1-6 of the DS0 timeslot sample B_0 (B_0[6:1]) into bits 0-5 of the payload byte 371. The microprocessor 102 places bits 0-1 of the DS0 timeslot sample C_0 (C_0[1:0]) into bits 6-7 of the payload byte 371, and places bits 2-6 of the DS0 timeslot sample C_0 (C_0[6:2]) into bits 0-4 of the payload byte 372.

The microprocessor 102 places bits 0-2 of the DS0 timeslot sample A_1 (A_1[2:0]) into bits 5-7 of the payload byte 372, and places bits 3-6 of the DS0 timeslot sample A_1 (A_1[6:3]) into bits 0-3 of the payload byte 373. The microprocessor 102 places bits 0-3 of the DS0 timeslot sample B_1 (B_1[3:0]) into bits 4-7 of the payload byte 373, and places bits 4-6 of the DS0 timeslot sample B_1 (B_1[6:4]) into bits 0-2 of the payload byte 374. The microprocessor 102 places bits 0-4 of the DS0 timeslot sample C_1 (C_1[4:0]) into bits 3-7 of the payload byte 374, and places bits 5-6 of the DS0 timeslot sample C_1 (C_1[6:5]) into bits 0-1 of the payload byte 375. The microprocessor 102 places bits 0-5 of the DS0 timeslot sample A_2 (A_2[5:0]) into bits 2-7 of the payload byte 375, and places bit 6 of the DS0 timeslot sample A_2 (A_2[6]) into bit 0 of the payload byte 376. The microprocessor 102 places bits 0-6 of the DS0 timeslot sample B_2 (A_2[6:0]) into bits 1-7 of the payload byte 376, and places bits 0-6 of the DS0 timeslot sample C_2 (C_2[6:0]) into bits 0-6 of the payload byte 377.

The byte skewed sequence continues into the outbound communication cell 363. The microprocessor 102 places the residue bits from the last DS0 sample (A_n[6:5]) into bits 0-1 of the payload byte 380. The microprocessor 102 does not set the align flag 366 because the payload byte 380 does not contain the aligned first DS0 timeslot sample of the N×DS0 channel.

The microprocessor 102 places bits 0-5 of the DS0 timeslot sample B_n (B_n[5:0]) into bits 2-7 of the payload byte 380, and places bit 6 of the DS0 timeslot sample B_n (B_n[6]) into bit 0 of the payload byte 381. The microprocessor 102 places bits 0-6 of the DS0 timeslot sample C_n (C_n[6:0]) into bits 1-7 of the payload byte 381, and places bits 0-6 of the DS0 timeslot sample A_n+1 (A_n+1[6:0]) into bits 0-6 of the payload byte 382.

Figure 7:
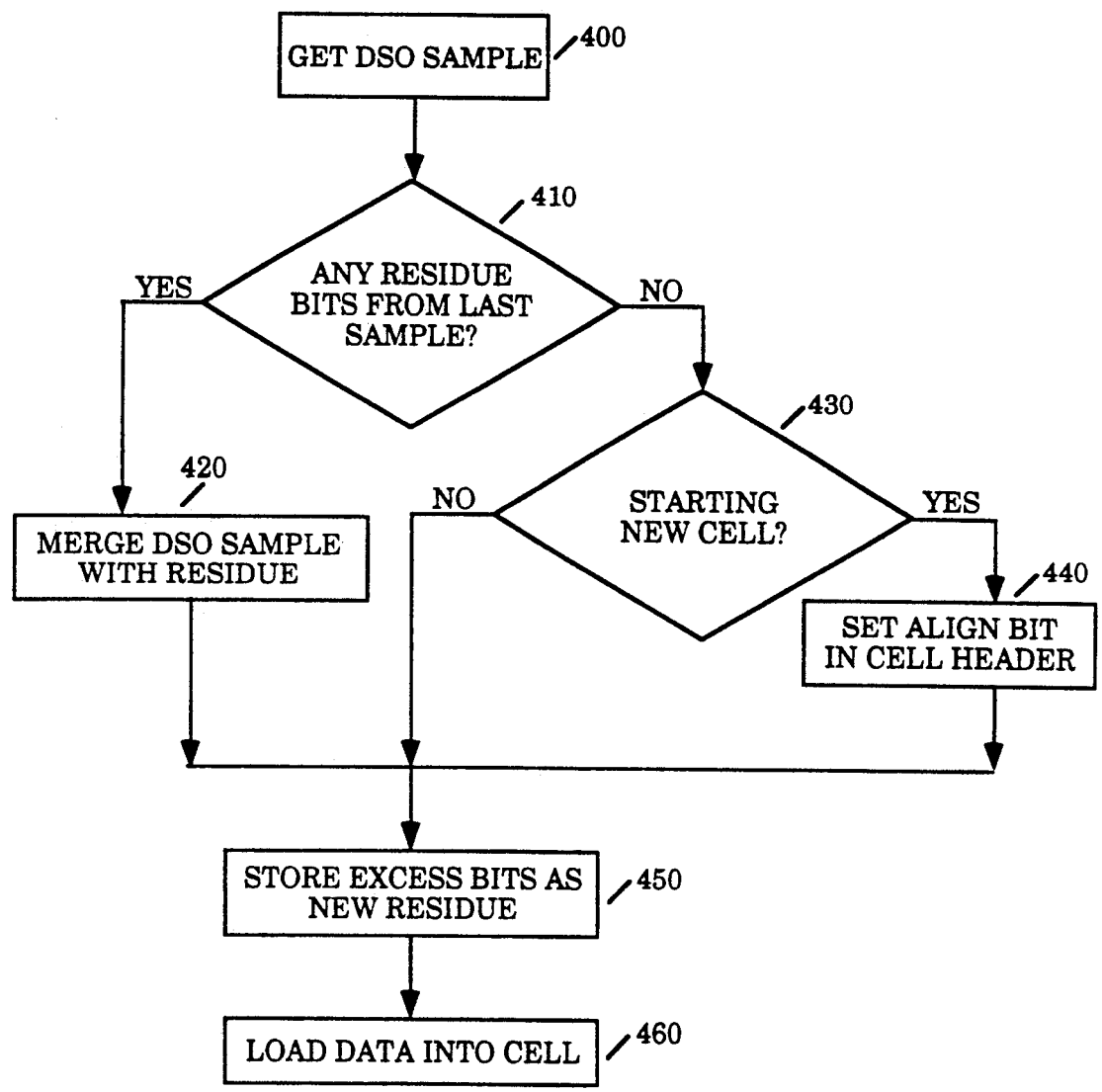
FIG. 7 is a flow diagram illustrating a method for setting the align flag of an outbound communication cell for transfer over the cell network, wherein the outbound communication cell is assembled from a DS1 data stream comprising DS0-A timeslots.

FIG. 7 is a flow diagram illustrating a method for setting the align flag of an outbound communication cell for transfer over the cell network 20, wherein the outbound communication cell is assembled from a DS1 data stream comprising DS0-A timeslots. For purposes of illustration, the UAI 50 receives the DS1 data stream over the communication link 82.

At block 400, the microprocessor 102 obtains a DS0 sample of the DS1 data stream from the transceiver 100. At decision block 410, the microprocessor 102 determines whether any residue bits exist from the last DS0 sample obtained from transceiver 100 that corresponds to the timeslot of the DS0 sample.

If residue bits exist from the last DS0 sample at decision block 410, then control proceeds to block 420. At block 420, the microprocessor 102 merges the DS0 sample with the residue bits from the last DS0 sample that corresponds to the timeslot of the DS0 sample. Control then proceeds to block 450. At block 450, the new residue bits are stored. The new residue bits are the bits in excess of the cell payload unit from the total bits resulting from the merging of the DS0 sample with the prior residue bits. Thereafter at block 460, a payload unit of the merged data is stored in a payload entry of the outbound communication cell.

If residue bits do not exist from the last DS0 sample at decision block 410, then control proceeds to decision block 430. At decision block 430, the microprocessor 102 determines whether the first payload entry of a new outbound communication cell is being assembled. If the first payload entry of a new outbound communication cell is not being assembled at decision block 430, then control proceeds to block 450.

If the first payload entry of a new outbound communication cell is being assembled at decision block 430, then control proceeds to block 440. At block 440, the microprocessor 102 sets the align flag in the header of the outbound communication cell. Control then proceeds to block 450.

Figure 8:
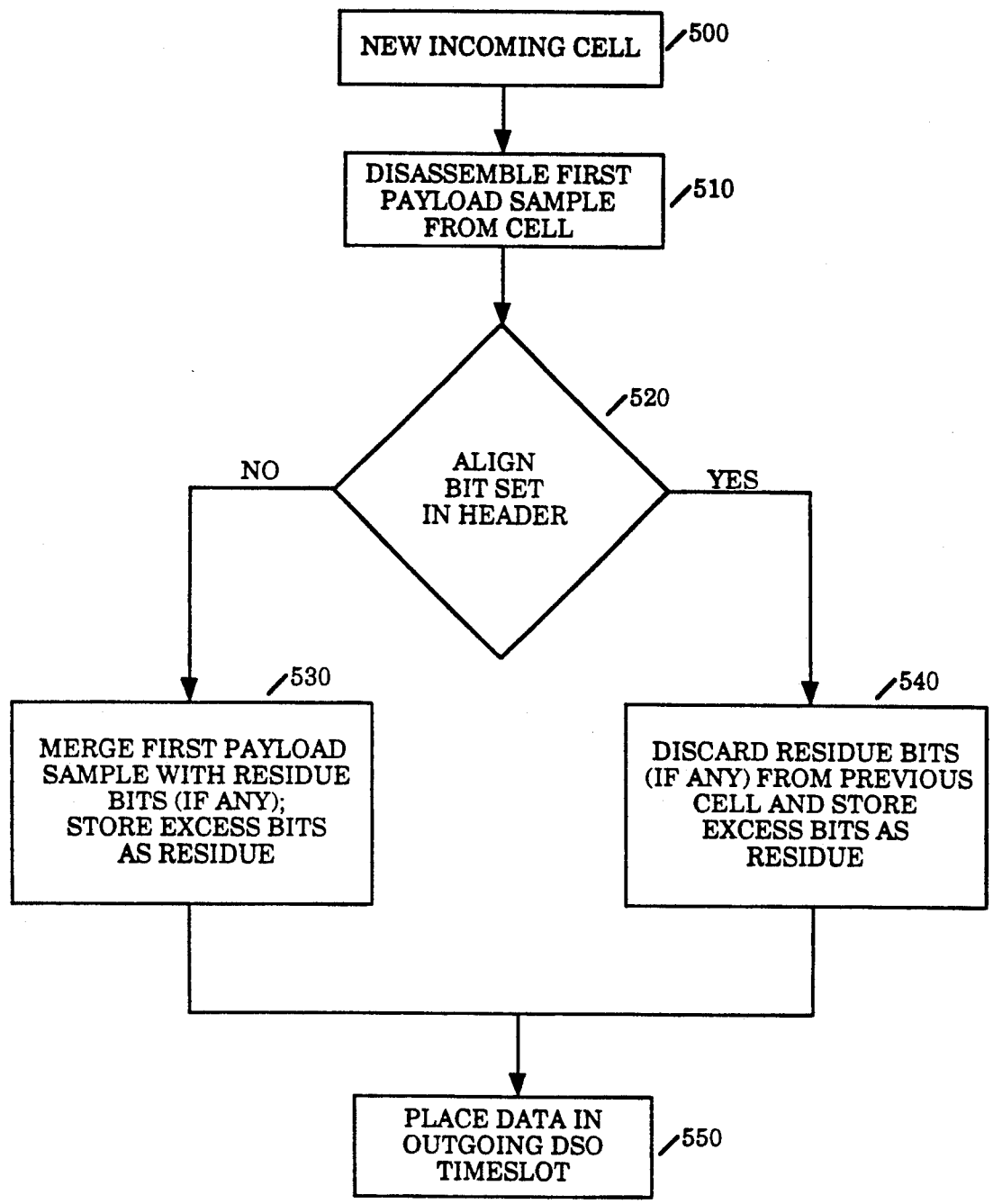
FIG. 8 is a flow diagram illustrating a method for disassembling an inbound communication cell to restore alignment, wherein the inbound communication cell is assembled from DS0-A timeslots.

FIG. 8 is a flow diagram illustrating a method for disassembling an inbound communication cell to restore alignment, wherein the inbound communication cell is assembled from DS0-A timeslots. For purposes of illustration, the UAI 50 receives the inbound communication cell over the cell bus 60.

At block 500, the microprocessor 102 accesses a newly arrived inbound communication cell from the received cell queue 106. At block 510, the microprocessor 102 disassembles the first payload sample from the inbound communication cell. Control then proceeds to decision block 520 where the microprocessor 102 checks the align flag in the header of the inbound communication cell.

At decision block 520, if the align flag is set in the header of the inbound communication cell, then control proceeds to block 540. At block 540, the microprocessor 102 discards any residue bits from the previous inbound communication cell. Also at block 540, the microprocessor 102 assembles the timeslot sample and stores excess bits as residue bits. Control then proceeds to block 550, where the microprocessor 102 transfers the timeslot sample to the transceiver 100 for an outgoing DS0 timeslot on the communication link 82.

At decision block 520, if the align flag is not set in the header of the inbound communication cell, then control proceeds to block 530. At block 530, the microprocessor 102 merges the first payload sample with any residue bits from the last sample of the previous inbound communication cell. Also at block 540, the microprocessor 102 stores the excess bits as residue bits. Control then proceeds to block 550 to transfer the payload sample in outgoing DS0 timeslot on the communication link 82.

Figure 9:
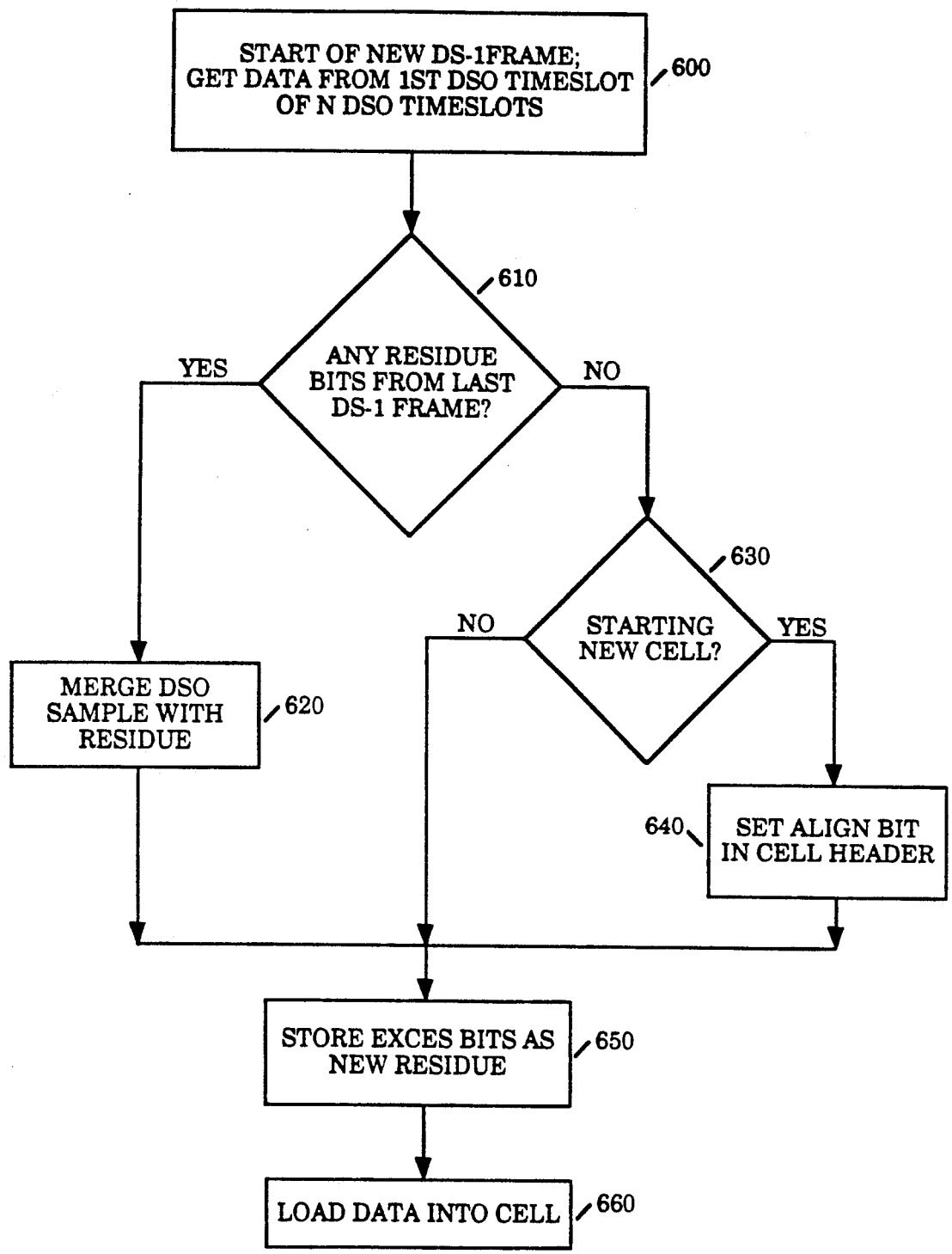
FIG. 9 is a flow diagram illustrating a method for setting the align flag of an outbound communication cell for transfer over the cell network, wherein the outbound communication cell is assembled from a DS1 data stream comprising N×DS0 timeslots.

FIG. 9 is a flow diagram illustrating a method for setting the align flag of an outbound communication cell for transfer over the cell network 20, wherein the outbound communication cell is assembled from a DS1 data stream comprising NxDS0 timeslots. For purposes of illustration, the UAI 50 receives the DS1 data stream over the communication link 82.

At block 600, the microprocessor 102 starts sampling a new DS1 frame and gets a DS0 sample corresponding to the first DS0 timeslot of the NxDS0 timeslots from the transceiver 100. At decision block 6410, the microprocessor 102 determines whether any residue bits exist from the NxDS0 set of the last DS1 frame.

If residue bits exist at decision block 610, then control proceeds to block 620. At block 620, the microprocessor 102 merges the DS0 sample with the residue bits from the last DS1 frame. Control then proceeds to block 650. At block 650, the new residue bits are stored. The new residue bits are the bits in excess of the cell payload unit from the total bits resulting from the merging o the DS0 sample with the prior residue bits. Thereafter at block 660, the merged data is stored in a payload entry of the outbound communication cell.

If residue bits do not exist at decision block 610, then control proceeds to decision block 630. At decision block 630, the microprocessor 102 determines whether the first payload entry of a new outbound communication cell is being assembled. If the first payload entry of a new outbound communication cell is not being assembled at decision block 630, then control proceeds to block 650.

If the first payload entry of a new outbound communication cell is being assembled at decision block 630, then control proceeds to block 640. At block 640, the microprocessor 102 sets the align flag in the header of the outbound communication cell. Control then proceeds to block 650.

Figure 10:
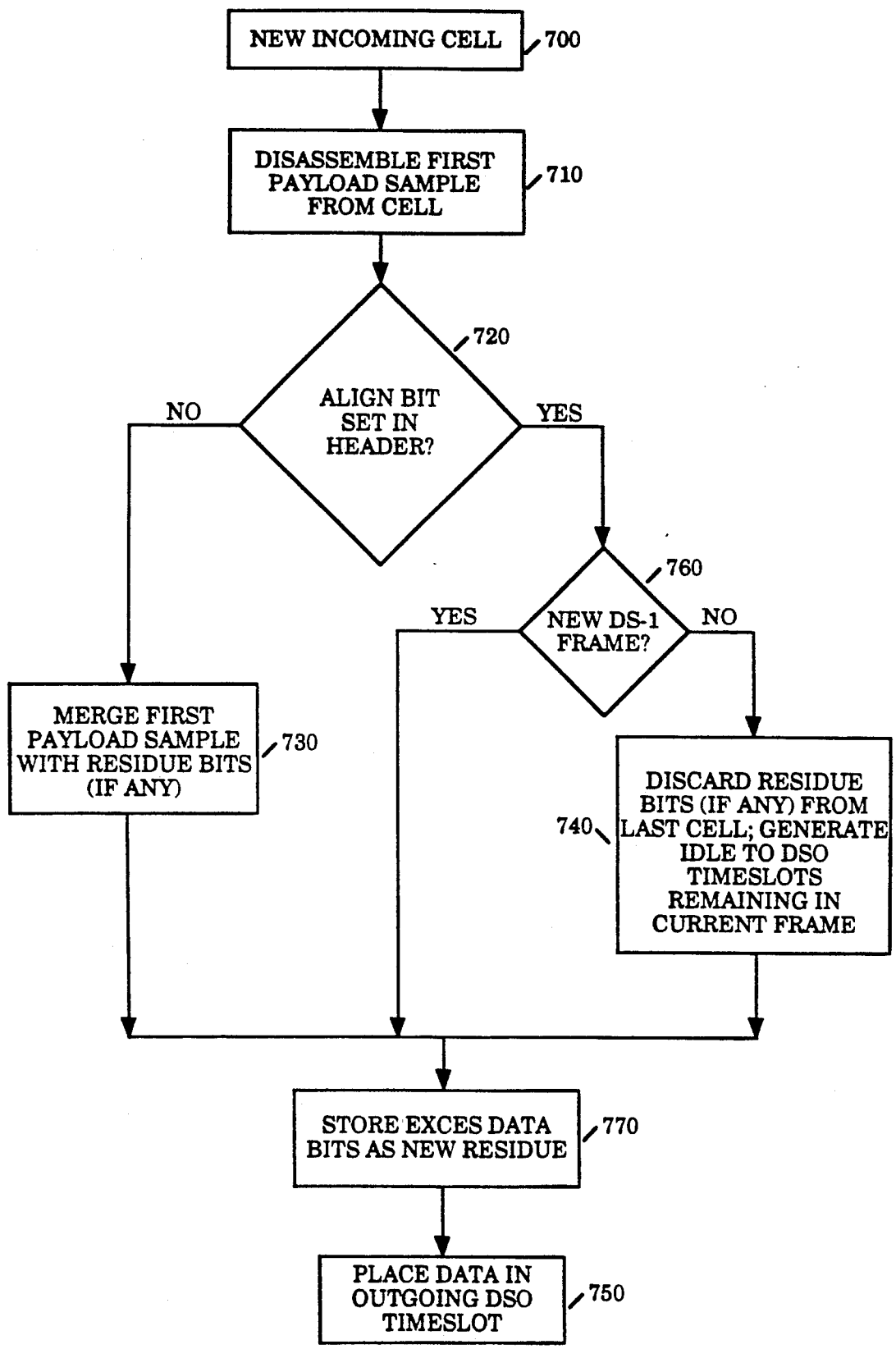
FIG. 10 is a flow diagram illustrating a method for disassembling an inbound communication cell to restore alignment, wherein the inbound communication cell is assembled from N×DS0 timeslots.

FIG. 10 is a flow diagram illustrating a method for disassembling an inbound communication cell to restore alignment, wherein the inbound communication cell is assembled from NxDS0 timeslots. For purposes of illustration, the UAI 50 receives the inbound communication cell over the cell bus 60.

At block 700, the microprocessor 102 accesses an inbound communication cell from the received cell queue 106. At block 710, the microprocessor 102 disassembles the first payload sample from the inbound communication cell. Control then proceeds to decision block 720 where the microprocessor 102 checks the align flag in the header of the inbound communication cell.

At decision block 720, if the align flag is not set in the header of the inbound communication cell, then control proceeds to block 730. At block 730, the microprocessor 102 merges the first payload sample with any residue bits from the last sample of the previous inbound communication cell. Thereafter at block 770, the new residue bits are stored. The new residue bits are the bits in excess of the cell payload unit from the total bits resulting from the merging of the payload sample with the prior residue bits. Control then proceeds to block 750 to transfer the merged data in outgoing DS0 timeslot on the communication link 82.

At decision block 720, if the align flag is set in the header of the inbound communication cell, then control proceeds to block decision 760. At decision block 760, if a new DS1 frame is being started, then control proceeds to block 770. At decision block 760, if a new DS1 frame is not being started, then control proceeds to block 740.

At block 740, the microprocessor 102 discards any residue bits from the previous inbound communication cell. Also at block 740, the microprocessor 102 causes the transceiver 100 to generate an idle condition for the DS0 timeslots remaining in the current DS1 frame. Thus, the first sample will be placed in the first timeslot of the NxDS0 set of the next DS1 frame. Control then proceeds to block 770.

Communication cells having the align flag set can be referred to as alignment data cells. The time between occurrences of the alignment data cells varies according to the configuration of the communication network. For one embodiment, the time between occurrences of the alignment data cells is mathematically predictable according to the equation:

$$T = L/s$$

where

T = the alignment data cell frequency in number of cells,

L = the lowest common multiple of the DS0 payload and the cell data payload in bits, s = the cell data payload in bits.

For example, the DS0 payload is 7 bits for subrate DS0-A, and 8 bits for 56 kbps DS0-A. For NxDS0 applications, the DS0 payload equals the sum of the bits in the N timeslots, excluding any one's density bits. The cell data payload is the data capacity of a cell in bits, excluding any density bits in ⅞ coding. In the worst case analysis for one embodiment, L equals the product of the DS0 payload and the cell data payload in bits. Therefore, the worst case time between occurrences of the alignment data cells is independent of the data rate and the cell payload when measured in number of cells. The time between occurrences of the alignment data cells in absolute time varies with the user data rate.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for aligning a digital communication data stream across a cell network, comprising the steps of:

generating a plurality of samples by sampling the digital communication data stream on a first circuit-switching communication link;

assembling the samples into at least one communication cell, and setting an align flag in the communication cell if the communication cell contains an aligned sample;

transferring the communication cell over a cell network according to a packet-switching communication protocol;

sampling the communication cell over the cell network, and disassembling the communication cell;

aligning the samples on a second circuit-switching communication link if the align flag is set, and transferring the samples over the second circuit-switching communication link.

2. The method of claim 1, wherein the digital communication data stream comprises a plurality of timeslot channels, each timeslot channel comprising a plurality of data bits.

3. The method of claim 2, wherein the step of generating a plurality of samples comprises the step of sampling the data bits of the timeslot channels.

4. The method of claim 3, wherein the step of assembling the samples into at least one communication cell comprises the step of transferring the data bits to a payload portion of the communication cell.

5. The method of claim 4, wherein the communication cell comprises a header portion including the align flag, and a plurality of payload data entries.

6. The method of claim 5, wherein the step of setting an align flag in the communication cell comprises the step of setting the align flag in the header portion if a first payload data entry of the payload data entries contains a bit aligned sample.

7. The method of claim 4, wherein the step of transferring the data bits to the communication cell comprises the step of transferring the data bits to the payload data entries, such that the data bits of a current sample are merged with at least one residual bit from the data bits of a previous sample.

8. The method of claim 7, wherein the step of disassembling the communication cell comprises the step of accessing the samples from the payload entries, such that the current sample is merged with the residual bits of the previous sample.

9. The method of claim 8, wherein the step of aligning the samples on a second circuit-switching communication link comprises the step of discarding the residual bits of the previous sample if the align flag in the header portion is set.

10. The method of claim 9, wherein the step of transferring the samples over the second circuit-switching communication link comprises the step of transferring the data bits of the samples into a plurality of timeslot channels over the second circuit-switching communication link.

11. The method of claim 1, wherein the digital communication data stream comprises at least one DS1 frame.

12. The method of claim 11, wherein the digital communication data stream comprises a plurality of DS0-A timeslots, each DS0-A timeslot comprising a plurality of data bits, and a C bit.

13. The method of claim 12, wherein the step of generating a plurality of samples comprises the step of generating a plurality of timeslot samples by sampling the data bits, and the C bit of the DS0-A timeslots.

14. The method of claim 13, wherein the step of assembling the samples into at least one communication cell comprises the step of transferring the data bits, and the C bit of timeslot samples to a payload portion of the communication cell.

15. The method of claim 14, wherein the communication cell comprises a header portion including the align flag, and a plurality of payload data entries.

16. The method of claim 15, wherein the step of setting an align flag in the communication cell comprises the step of setting the align flag in the header portion if a first payload data entry of the payload data entries contains a bit aligned C bit.

17. The method of claim 16, wherein the step of transferring the data bits, and the C bit of timeslot samples to the communication cell comprises the step of transferring the data bits and the C bit of the timeslot samples to the payload data entries, such that the data bits and the C bit of a current timeslot sample are merged with at least one residual bit from the data bits and the C bit of a previous timeslot sample.

18. The method of claim 17, wherein the step of disassembling the communication cell comprises the step of accessing the timeslot samples from the payload entries, such that the current timeslot sample is merged with residual bits of the previous timeslot sample.

19. The method of claim 18, wherein the step of aligning the samples on a second circuit-switching communication link comprises the step of discarding the residual bits of the previous timeslot sample if the align flag in the header portion is set.

20. The method of claim 19, wherein the step of transferring the samples over the second circuit-switching communication link comprises the step of transferring the data bits and the C bit of the timeslot samples into a plurality of DS0-A timeslots over the second circuit-switching communication link.

21. The method of claim 11, wherein the digital communication data stream comprises a plurality of N×DS0 timeslots, each N×DS0 timeslot comprising a plurality of data bits.

22. The method of claim 21, wherein the step of generating a plurality of samples comprises the step of generating a plurality of timeslot samples by sampling the data bits of the N×DS0 timeslots.

23. The method of claim 22, wherein the step of assembling the samples into at least one communication cell comprises the step of transferring the data bits of the timeslot samples to a payload portion of the communication cell.

24. The method of claim 23, wherein the communication cell comprises a header portion including the align flag, and a plurality of payload data entries.

25. The method of claim 24, wherein the step of setting an align flag in the communication cell comprises the step of setting the align flag in the header portion if a first payload data entry of the payload data entries contains a byte aligned first DS0 timeslot of the N×DS0 timeslots.

26. The method of claim 25, wherein the step of transferring the data bits of the timeslot samples to the communication cell comprises the step of transferring the data bits of the timeslot samples to the payload data entries, such that the data bits of a current timeslot sample are merged with the residual bits from the data bits of a previous timeslot sample.

27. The method of claim 26, wherein the step of disassembling the communication cell comprises the step of accessing the timeslot samples from the payload entries, such that the current timeslot sample is merged with residual bits of the previous timeslot sample.

28. The method of claim 27, wherein the step of aligning the samples on a second circuit-switching communication link comprises the step of discarding the residual bits of the previous timeslot sample if the align flag in the header portion is set.

29. The method of claim 28, wherein the step of aligning the samples on a second circuit-switching communication link further comprises the step of generating at least one idle DS0 time slot over the second circuit-switching communication link.

30. The method of claim 29, wherein the step of transferring the samples over the second circuit-switching communication link comprises the step of transferring the data bits of the timeslot samples into a plurality of N×DS0 timeslots over the second circuit-switching communication link.

31. An apparatus for aligning a digital communication data stream across a cell network, comprising:
means for generating a plurality of samples by sampling the digital communication data stream on a first circuit-switching communication link;
means for assembling the samples into at least one communication cell, and setting an align flag in the communication cell if the communication cell contains an aligned sample;
means for transferring the communication cell over a cell network according to a packet-switching communication protocol;
means for sampling the communication cell over the cell network, and disassembling the communication cell;
means for aligning the samples on a second circuit-switching communication link if the align flag is set, and transferring the samples over the second circuit-switching communication link.

32. The apparatus of claim 31, wherein the digital communication data stream comprises a plurality of timeslot channels, each timeslot channel comprising a plurality of data bits.

33. The apparatus of claim 32, wherein the means for generating a plurality of samples comprises means for sampling the data bits of the timeslot channels.

34. The apparatus of claim 33, wherein the means for assembling the samples into at least one communication cell comprises means for transferring the data bits to a payload portion of the communication cell.

35. The apparatus of claim 34, wherein the communication cell comprises a header portion including the align flag, and a plurality of payload data entries.

36. The apparatus of claim 35, wherein the means for setting the align flag in the communication cell comprises means for setting the align flag in the header portion if a first payload data entry of the payload data entries contains a bit aligned sample.

37. The apparatus of claim 34, wherein the means for transferring the data bits to the communication cell comprises means for transferring the data bits to the payload data entries, such that the data bits of a current sample are merged with at least one residual bit from the data bits of a previous sample.

38. The apparatus of claim 37, wherein the means for disassembling the communication cell comprises means for accessing the samples from the payload entries, such that the current sample is merged with the residual bits of the previous sample.

39. The apparatus of claim 38, wherein the means for aligning the samples on a second circuit-switching communication link comprises means for discarding the residual bits of the previous sample if the align flag in the header portion is set.

40. The apparatus of claim 39, wherein the means for transferring the samples over the second circuit-switching communication link comprises means for transferring the data bits of the samples into a plurality of timeslot channels over the second circuit-switching communication link.

41. The apparatus of claim 31, wherein the digital communication data stream comprises at least one DS1 frame.

42. The apparatus of claim 41, wherein the digital communication data stream comprises a plurality of DS0-A timeslots, each DS0-A timeslot comprising a plurality of data bits, and a C bit.

43. The apparatus of claim 42, wherein the means for generating a plurality of samples comprises means for generating a plurality of timeslot samples by sampling the data bits, and the C bit of the DS0-A timeslots.

44. The apparatus of claim 43, wherein the means for assembling the samples into at least one communication cell comprises means for transferring the data bits, and the C bit of timeslot samples to a payload portion of the communication cell.

45. The apparatus of claim 44, wherein the communication cell comprises a header portion including the align flag, and a plurality of payload data entries.

46. The apparatus of claim 45, wherein the means for setting an align flag in the communication cell comprises means for setting the align flag in the header portion if a first payload data entry of the payload data entries contains a bit aligned C bit.

47. The apparatus of claim 46, wherein the means for transferring the data bits, and the C bit of timeslot samples to the communication cell comprises means for transferring the data bits and the C bit of the timeslot samples to the payload data entries, such that the data bits and the C bit of a current timeslot sample are merged with residual bits from the data bits and the C bit of a previous timeslot sample.

48. The apparatus of claim 47, wherein the means for disassembling the communication cell comprises means for accessing the timeslot samples from the payload entries, such that the current timeslot sample is merged with residual bits of the previous timeslot sample.

49. The apparatus of claim 48, wherein the means for aligning the samples on a second circuit-switching communication link comprises means for discarding the residual bits of the previous timeslot sample if the align flag in the header portion is set.

50. The apparatus of claim 49, wherein the means for transferring the samples over the second circuit-switching communication link comprises means for transferring the data bits and the C bit of the timeslot samples into a plurality of DS0-A timeslots over the second circuit-switching communication link.

51. The apparatus of claim 41, wherein the digital communication data stream comprises a plurality of N×DS0 timeslots, each N×DS0 timeslot comprising a plurality of data bits.

52. The apparatus of claim 51, wherein the means for generating a plurality of samples comprises means for generating a plurality of timeslot samples by sampling the data bits of the N×DS0 timeslots.

53. The apparatus of claim 52, wherein the means for assembling the samples into at least one communication cell comprises means for transferring the data bits of the timeslot samples to a payload portion of the communication cell.

54. The apparatus of claim 53, wherein the communication cell comprises a header portion including the align flag, and a plurality of payload data entries.

55. The apparatus of claim 54, wherein the means for setting an align flag in the communication cell comprises means for setting the align flag in the header portion if a first payload data entry of the payload data entries contains a byte aligned first DS0 timeslot of the N×DS0 timeslots.

56. The apparatus of claim 55, wherein the means for transferring the data bits of the timeslot samples to the communication cell comprises means for transferring the data bits of the timeslot samples to the payload data entries, such that the data bits of a current timeslot sample are merged with the residual bits from the data bits of a previous timeslot sample.

57. The apparatus of claim 56, wherein the means for disassembling the communication cell comprises means for accessing the timeslot samples from the payload entries, such that the current timeslot sample is merged with residual bits of the previous timeslot sample.

58. The apparatus of claim 57, wherein the means for aligning the samples on a second circuit-switching communication link comprises means for discarding the residual bits of the previous timeslot sample if the align flag in the header portion is set.

59. The apparatus of claim 58, wherein the means for aligning the samples on a second circuit-switching communication link comprises means for generating at least one idle DS0 time slot over the second circuit-switching communication link.

60. The apparatus of claim 59, wherein the means for transferring the samples over the second circuit-switching communication link comprises means for transferring the data bits of the timeslot samples into a plurality of N×DS0 timeslots over the second circuit-switching communication link.

* * * * *